J. H. ALLISON.
Wheel Cultivator.
No. 64,469. Patented May. 7. 1867.
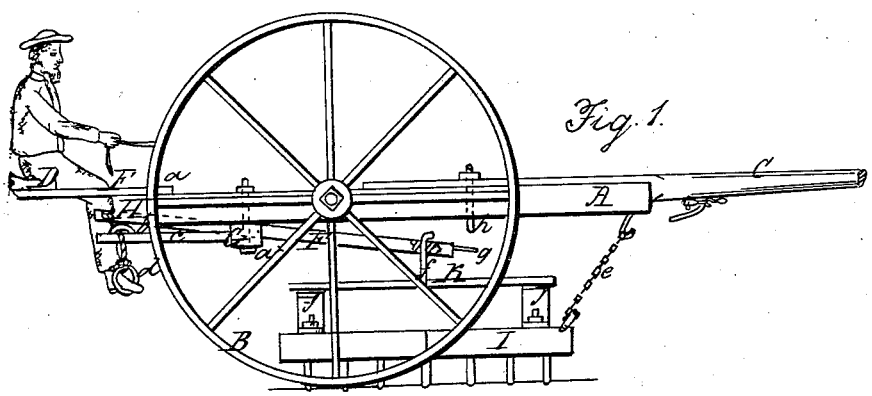
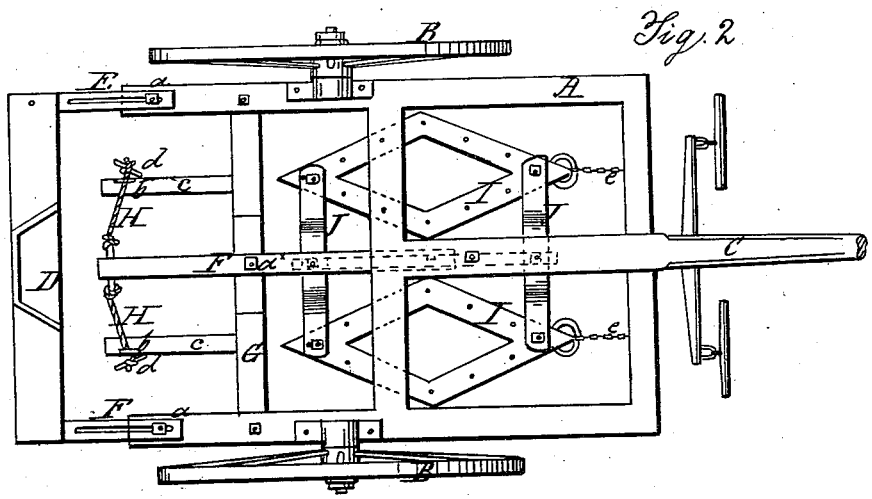
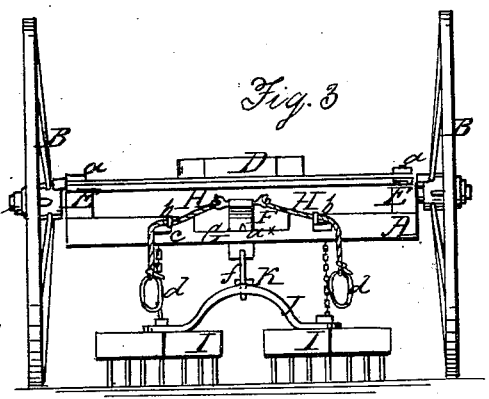

United States Patent Office.

JOHN H. ALLISON, OF EUREKA, ILLINOIS.

Letters Patent No. 64,469, dated May 7, 1867.

IMPROVEMENT IN CULTIVATORS.

*The Schedule referred to in these Letters Patent and making part of the same.*

TO ALL WHOM IT MAY CONCERN:

Be it known that I, J. H. ALLISON, of Eureka, in the county of Woodford, and State of Illinois, have invented a new and improved Cultivator; and I do hereby declare that the following is a full, clear, and exact description thereof, which will enable those skilled in the art to make and use the same, reference being had to the accompanying drawings, forming part of this specification, in which—

Figure 1 is a side view of my invention.

Figure 2, a plan or top view of the same.

Figure 3, a rear view of the same.

Similar letters of reference indicate like parts.

This invention relates to a new and improved device for cultivating young corn and other crops grown in hills or drills, and also for harrowing in small seeds.

A represents a rectangular frame which is mounted on two wheels, B B, and has a draught-pole, C, attached to it. D is the driver's seat, the ends of which are secured to parallel bars E E, the latter being slotted longitudinally, and nearly their whole length, and secured to the rear part of the frame A by screw-bolts $a$ which pass through the slots in the bars E. By this arrangement the seat D may be adjusted further in or out, according to the weight of the driver, so as to keep the device in a counterpoised state and relieve the necks of the draught animals of the weight of the device. F is a foot-lever which has its fulcrum $a^\times$ on a cross-bar, G, of the frame A, and extends sufficiently far back of the bar G to be within convenient reach of the feet of the driver. The rear end of this foot-lever F has two cords H H attached, which pass through eyes $b$ at the outer ends of arms $c\ c$ which project from the bar G, and have rings or knobs $d$ on their ends. These cords H H serve as stirrups for the feet. I I are two harrows of lozenge form, and connected together by metal straps J J. The front ends of these harrows are connected by chains $e\ e$ to the front cross-bar of the frame A, and the two metal straps J J are connected by a bar, K, to about the centre of which the front end of the foot-lever F is connected by a hooked rod, $f$.

From the above description it will be seen that as the machine is drawn along the driver on seat D may, by actuating the foot-lever F, move the harrows either to the right or left so that they will conform to the sinuosities of the rows of plants, and the harrows may also be raised above the surface of the ground when not required to operate, as, for instance, in transporting or drawing the device from place to place, or in turning it at the ends of rows. In drawing the device from place to place a rod, $g$, on the front end of the foot-lever F, is inserted over a hook, $h$, at the rear end of the draught-pole. The device is under the complete control of the driver, is perfectly simple in construction, and may be manufactured at a very reasonable cost.

Having thus described my invention, what I claim as new, and desire to secure by Letters Patent, is—

1. The harrows I I connected together and to the front part of the frame A, as shown, in combination with the foot-lever F, all arranged to operate in the manner substantially as and for the purpose set forth.

2. I further claim the adjustable driver's seat D, in combination with the harrows and foot-lever, substantially as and for the purpose specified.

J. H. ALLISON.

Witnesses:
A. M. MYERS,
H. C. BAIRD.